US012681900B2

(12) United States Patent
Derzhavetz et al.

(10) Patent No.: US 12,681,900 B2
(45) Date of Patent: Jul. 14, 2026

(54) DESTAGING METADATA CHANGES FROM IN-MEMORY BUCKETS TO PERSISTENT BUCKETS OF VARIABLE SIZE

(71) Applicant: Dell Products L.P., Round Rock, TX (US)

(72) Inventors: Jenny Derzhavetz, Raanana (IL); Vladimir Shveidel, Pardes Hana-Karkur (IL); Erez Sharvit, Ramat Gan (IL)

(73) Assignee: Dell Products L.P., Round Rock, TX (US)

( * ) Notice: Subject to any disclaimer, the term of this patent is extended or adjusted under 35 U.S.C. 154(b) by 179 days.

(21) Appl. No.: 18/641,531

(22) Filed: Apr. 22, 2024

(65) Prior Publication Data

US 2025/0328497 A1 Oct. 23, 2025

(51) Int. Cl.
*G06F 16/17* (2019.01)
*G06F 16/18* (2019.01)
*G06F 16/182* (2019.01)

(52) U.S. Cl.
CPC ...... *G06F 16/1734* (2019.01); *G06F 16/1824* (2019.01)

(58) Field of Classification Search
CPC .......................... G06F 16/1734; G06F 16/1824
See application file for complete search history.

(56) References Cited

U.S. PATENT DOCUMENTS

| | | | | |
|---|---|---|---|---|
| 11,068,199 | B2* | 7/2021 | Shveidel | G06F 3/0608 |
| 2005/0257083 | A1* | 11/2005 | Cousins | G06F 11/2058 |
| | | | | 711/114 |
| 2015/0348306 | A1* | 12/2015 | Yang | G06T 11/40 |
| | | | | 345/420 |
| 2020/0050480 | A1* | 2/2020 | Cao | G06F 3/067 |
| 2022/0147265 | A1* | 5/2022 | Durgin | G06F 16/285 |
| 2022/0342825 | A1 | 10/2022 | Derzhavetz et al. | |

OTHER PUBLICATIONS

Dovzhenko, Denis, et al.; "Managing Metadata of Variable Length Using Metadata Pages and Delta Records of Transaction Log," U.S. Appl. No. 18/069,331, filed Dec. 21, 2022.
Derzhavetz, Jenny, et al.; "Bypass Destaging of Decrement Reference Count Operations With Delta Log Based Architecture," U.S. Appl. No. 18/210,355, filed Jun. 15, 2023.

(Continued)

*Primary Examiner* — Rocio Del Mar Perez-Velez
*Assistant Examiner* — Kaitlyn H Pham
(74) *Attorney, Agent, or Firm* — BainwoodHuang

(57) ABSTRACT

A technique for tracking metadata changes includes, after receiving a first plurality of metadata changes into a plurality of in-memory buckets, destaging the first plurality of metadata changes to persistent buckets of a first size in a first persistent tablet. The technique further includes receiving a second plurality of metadata changes into the plurality of in-memory buckets and, in response to receiving an early-destage request prior to the plurality of in-memory buckets becoming full, destaging the second plurality of metadata changes to persistent buckets of a second size in a second persistent tablet, the second size being smaller than the first size.

18 Claims, 4 Drawing Sheets

(56)          References Cited

OTHER PUBLICATIONS

Derzhavetz, Jenny, et al.; "Techniques Using a Variable Size Extension Area With Two Phase Destaging," United States U.S. Appl. No. 18/141,722, filed May 1, 2023.

Derzhavetz, Jenny, et al.; "Processing Metadata Changes Using Multiple Aggregation Policies," U.S. Appl. No. 18/494,196, filed Oct. 25, 2023.

Derzhavetz, Jenny, et al.; "System and Method for Lockless Reading of Metadata Pages"; U.S. Appl. No. 17/237,398, filed Apr. 22, 2021.

Shveidel, Vladimir, et al.; "System and Method for Aggregating Metadata Changes in Storage System"; U.S. Appl. No. 16/260,660, filed Jan. 29, 2019.

Shveidel, Vladimir, et al.; "Destaging Metadata Changes Using Read Locks," U.S. Appl. No. 18/414,632, filed Jan. 17, 2024.

* cited by examiner

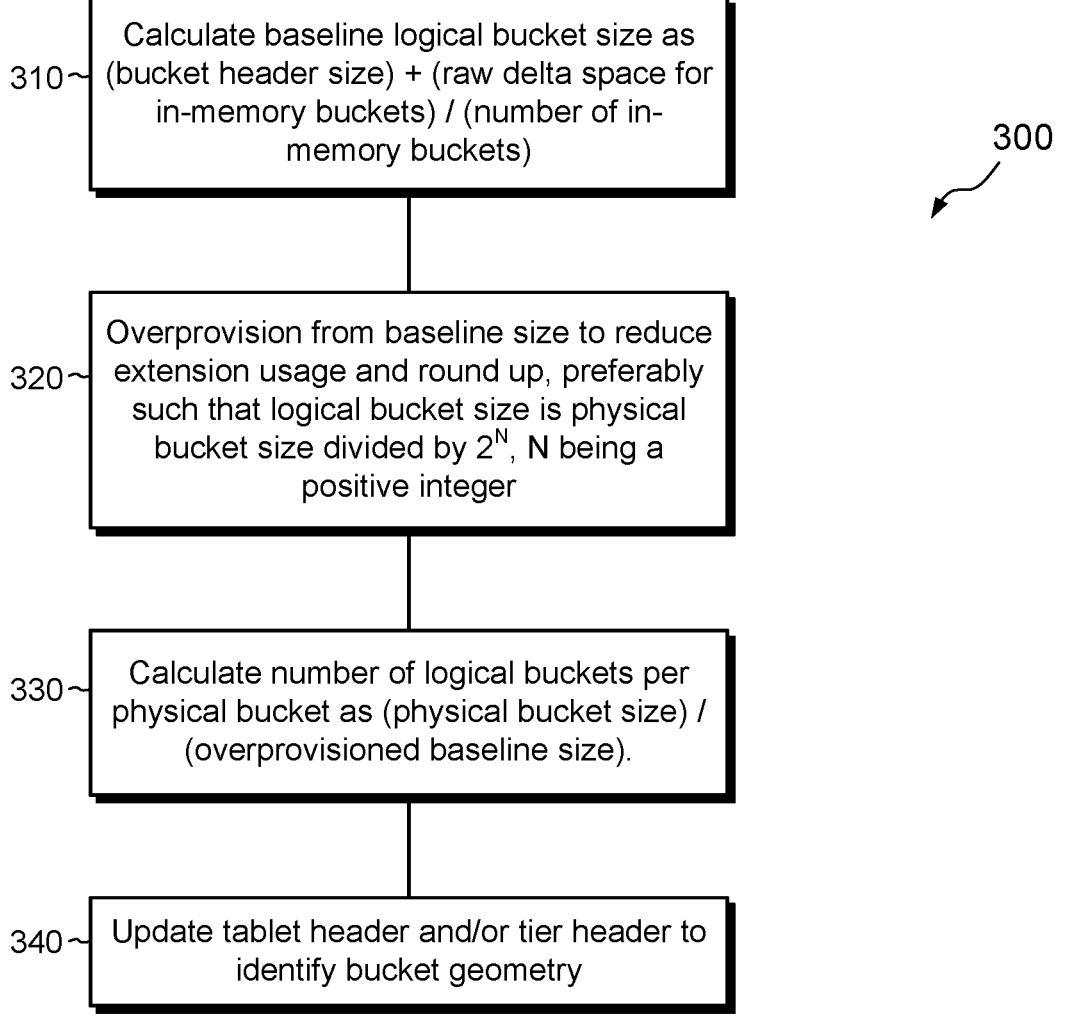

310 — Calculate baseline logical bucket size as (bucket header size) + (raw delta space for in-memory buckets) / (number of in-memory buckets)

320 — Overprovision from baseline size to reduce extension usage and round up, preferably such that logical bucket size is physical bucket size divided by $2^N$, N being a positive integer 330 — Calculate number of logical buckets per physical bucket as (physical bucket size) / (overprovisioned baseline size).

340 — Update tablet header and/or tier header to identify bucket geometry

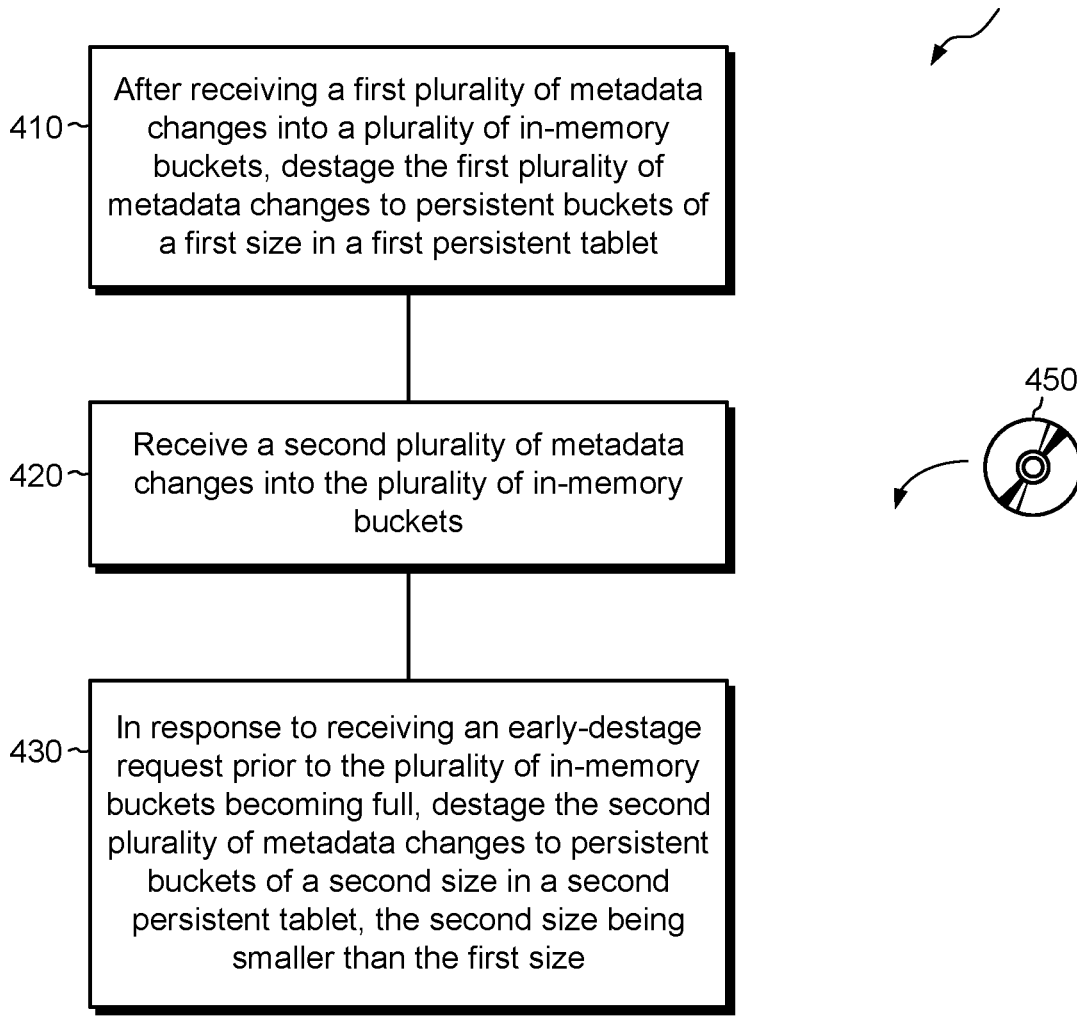

400

410 ~ After receiving a first plurality of metadata changes into a plurality of in-memory buckets, destage the first plurality of metadata changes to persistent buckets of a first size in a first persistent tablet 420 ~ Receive a second plurality of metadata changes into the plurality of in-memory buckets 430 ~ In response to receiving an early-destage request prior to the plurality of in-memory buckets becoming full, destage the second plurality of metadata changes to persistent buckets of a second size in a second persistent tablet, the second size being smaller than the first size

DESTAGING METADATA CHANGES FROM IN-MEMORY BUCKETS TO PERSISTENT BUCKETS OF VARIABLE SIZE

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Typical storage system activities involve modifying metadata pages that describe and organize user data. In one arrangement, a storage system forms metadata changes and writes the changes in a compact format to an array of in-memory buckets. The in-memory buckets may be organized, for example, based on identifiers of metadata pages. When the array of in-memory buckets becomes full, the storage system freezes the array of in-memory buckets and destages the frozen in-memory buckets to respective buckets in persistent memory, e.g., by copying the changes in each in-memory bucket to a respective persistent bucket. The storage system may process the entire array of in-memory buckets as a group, arranging the persistent buckets in a persistent tablet. The tablet thus contains all of the metadata changes that were accumulated in the array of in-memory buckets. The storage system may perform a second destage operation later, to update the affected metadata pages on disk. When initially writing metadata changes into the array of in-memory buckets, the storage system typically also writes the same changes to a persistent, time-ordered log, which may be provided for recovery purposes.

SUMMARY

Certain embodiments are directed to a method of tracking metadata changes. The method includes, after receiving a first plurality of metadata changes into a plurality of in-memory buckets, destaging the first plurality of metadata changes to persistent buckets of a first size in a first persistent tablet. The method further includes receiving a second plurality of metadata changes into the plurality of in-memory buckets and, in response to receiving an early-destage request prior to the plurality of in-memory buckets becoming full, destaging the second plurality of metadata changes to persistent buckets of a second size in a second persistent tablet, the second size being smaller than the first size.

In some examples, the plurality of in-memory buckets is part of a first metadata log (MDL), and the method further includes destaging to a third persistent tablet a third plurality of metadata changes received by in-memory buckets of a second MDL, wherein the early-destage request is issued in response to destaging the third plurality of metadata changes of the second MDL.

In some examples, the method further includes recording metadata changes received by both the first MDL and the second MDL in a persistent, time-ordered log, wherein the early-destage request is issued further in response to the persistent, time-ordered log becoming full.

In some examples, destaging the second plurality of metadata changes in response to the early-destage request enables space within the persistent, time-ordered log to be reclaimed, thus preventing an out-of-space condition from arising in the persistent, time-ordered log.

In some examples, destaging the first plurality of metadata changes to the persistent buckets in the first persistent tablet includes copying metadata changes from respective in-memory buckets of the plurality of in-memory buckets to respective physical buckets of the first persistent tablet, the physical buckets having uniform size.

In some examples, destaging the second plurality of metadata changes to the persistent buckets in the second persistent tablet includes copying metadata changes from respective in-memory buckets of the plurality of in-memory buckets to respective logical buckets within physical buckets of in the second persistent tablet, wherein multiple logical buckets are stored within each physical bucket of the second persistent tablet and wherein the physical buckets in the second persistent tablet have the same uniform size as the physical buckets in the first persistent tablet and wherein multiple logical buckets are stored within each physical bucket of the second persistent tablet.

In some examples, the logical buckets have uniform size, and a number of logical buckets within each physical bucket is a power of two.

In some examples, the method further includes determining the power of two such that, on average, the logical buckets are larger than required to store the metadata changes in respective in-memory buckets of the plurality of in-memory buckets.

In some examples, a logical bucket is too small to store all of the metadata changes from a respective in-memory bucket, and the method further includes storing an overflow of metadata changes in an extension region associated with the second persistent tablet.

In some examples, the logical buckets are not uniform in size, and multiple logical buckets are packed together within a physical bucket without gaps.

In some examples, the method further includes storing a header that identifies locations of respective logical buckets within a physical bucket.

Other embodiments are directed to a computerized apparatus constructed and arranged to perform a method of tracking metadata changes, such as the method described above, in accordance with any of the described variants. Still other embodiments are directed to a computer program product. The computer program product stores instructions which, when executed on control circuitry of a computerized apparatus, cause the computerized apparatus to perform a method of tracking metadata changes, such as the method described above in accordance with any of its described variants.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

FIG. 3 is a flowchart of an example method of establishing sizes of logical buckets according to some embodiments.

FIG. 4 is a flowchart of an example method of tracking metadata changes according to some embodiments.

DETAILED DESCRIPTION

Figure 1:
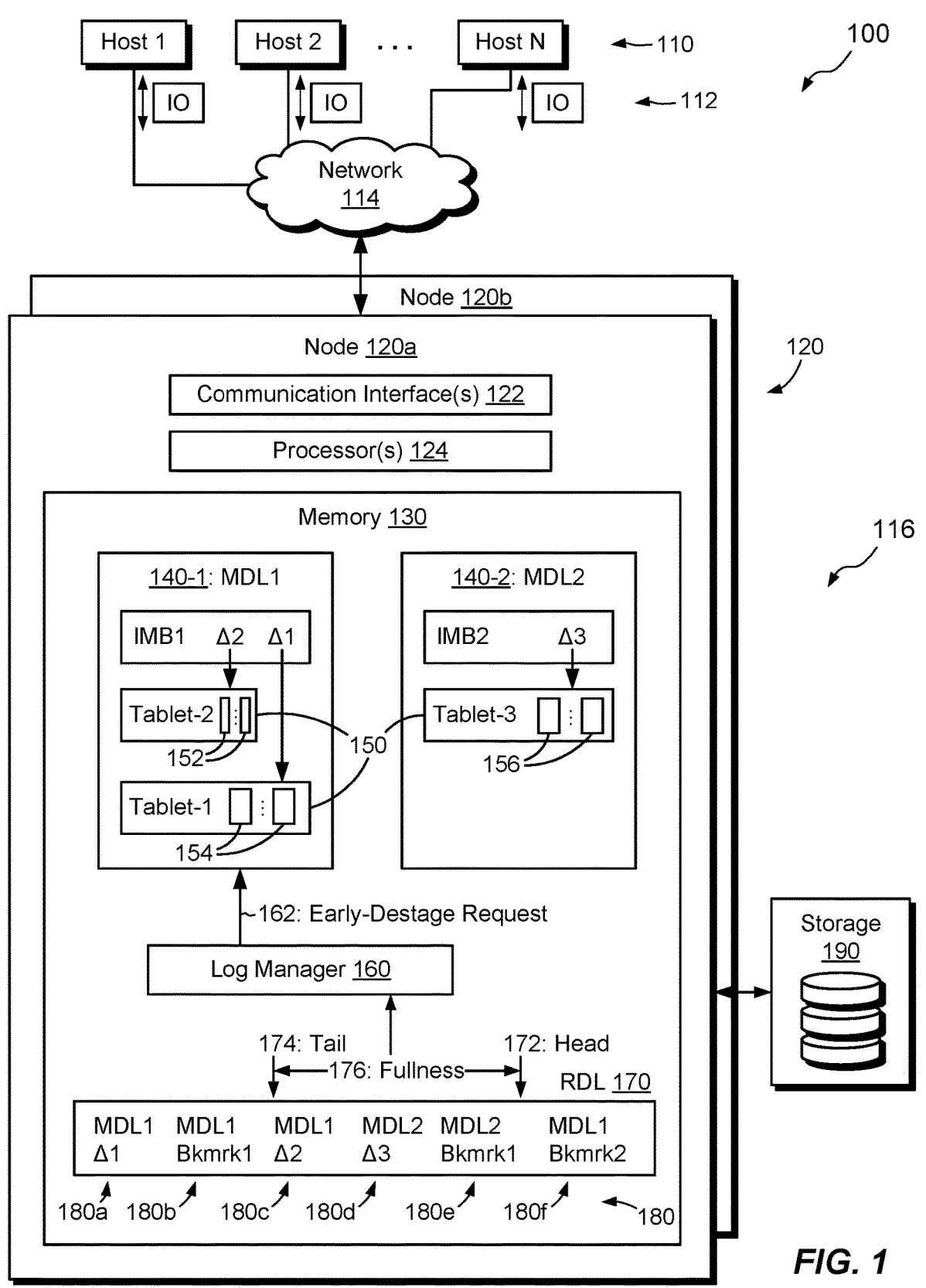
FIG. 1 is a block diagram of an example environment in which embodiments of the improved technique can be practiced.

Embodiments of the improved technique will now be described. One should appreciate that such embodiments are provided by way of example to illustrate certain features and principles but are not intended to be limiting.

Some storage systems use multiple instances of in-memory buckets and tablets for updating respective types of metadata. Such instances of in-memory buckets and tablets are referred to herein as metadata delta logs, or "MDLs." In an example, a storage system may use a first MDL for updating a first type (or first types) of metadata and a second MDL for updating a second type (or second types) of metadata. However, both MDLs may be used with the same persistent, time-ordered log for recording metadata changes in case of recovery. The persistent, time-ordered log may be referred to herein as a raw delta log, or "RDL."

The use of multiple MDLs with a single RDL can create dependencies. For example, the RDL may be arranged in a ring having a head and a tail. New metadata changes for the MDLs are added to the head, and the tail is advanced past older metadata changes once the older metadata changes have been destaged. As long as the different MDLs destage at about the same rate, the tail of the RDL continues to advance.

Unfortunately, scenarios can arise in which some MDLs fill more quickly than others, requiring more frequent destaging. For example, deletes of large volumes can cause large numbers of reference-count decrements, such that the MDL handling those decrements fills and requires destaging more frequently than the MDL (or MDLs) handling other types of changes. But because the MDLs all share the same RDL, the tail of the RDL can be held back by the slowest-filling MDL. In cases of extreme imbalance, the RDL can face an out-of-space condition, e.g., if the tail is held back by the slowest-filling MDL while changes continue to be added by the faster-filling MDL(s).

To prevent this outcome, the storage system may force the slowest-filling MDL to destage early, before its array of in-memory buckets is full. Such early destaging allows the tail of the RDL to advance, avoiding the out-of-space condition, but it comes at the cost of efficiency. For example, the early destage means that buckets in the persistent tablets of the slowest-filling MDL may be sparsely populated with changes, resulting in an inefficient use of tablet space. In extreme cases, large numbers of nearly empty tablets may be created. This scenario can also confuse the storage system's debt management, which may estimate deferred processing requirements based on numbers of persistent buckets. When early destage is used, the number of persistent buckets can grossly overestimate the processing debt actually accrued. What is needed, therefore, is a more efficient approach.

The above need is addressed at least in part by an improved technique of managing metadata changes. The technique includes destaging metadata changes from an array of in-memory buckets to persistent buckets having variable size. Larger persistent buckets are used when in-memory buckets are fuller, and smaller persistent buckets are used when in-memory buckets are less full.

Advantageously, the improved technique scales the sizes of persistent buckets based on the degree of filling of associated in-memory buckets and therefore reduces wasted space in persistent buckets that would otherwise result from early destaging. The improved technique also improves the accuracy of debt estimates by more completely filling persistent buckets, so that their number does not grossly overestimate the system debt.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120a and node 120b), and storage 190, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the nodes 120 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The nodes 120 are configured to receive I/O requests 112 according to block-based and/or file-based protocols and to respond to such I/O requests 112 by reading or writing the storage 190.

The depiction of node 120a is intended to be representative of all nodes 120. As shown, node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120a. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a first MDL 140-1 (MDL1), a second MDL 140-2 (MDL2), a log manager 160, and a raw delta log (RDL) 170, which is configured as a persistent, time-ordered log. In an example, MDL1 is provided for tracking changes in a first type of metadata, whereas MDL2 is provided for tracking changes in a second type of metadata. In a particular example, MDL1 is provided for tracking all types of metadata changes except for reference-count decrements, while MDL2 is provided solely for tracking reference-count decrements.

MDL1 includes an array IMB1 of in-memory buckets, which may number in the thousands or millions, for example. Similarly, MDL2 includes a separate array IMB2 of in-memory buckets, which may also number in the thousands or millions. IMB1 and IMB2 may each be realized in volatile memory.

In an example, both IMB1 and IMB2 arrange metadata changes in a compact format, such as a 4-tuple {LI; EI; T; V}, where LI is a logical index (identifier) of a metadata page in storage that contains the metadata being changed, EI is an entry index within the specified metadata page, T is a type of metadata, and V is a value. Tuples representing metadata changes may be formed within memory 130 and may be written to the in-memory buckets IMB1 and IMB2. For example, the type T of a tuple identifies the particular MDL to be written (e.g., MDL1 or MDL2), and the LI of the tuple identifies the particular in-memory bucket to be written within the identified MDL. For example, each in-memory bucket within each array of in-memory buckets corresponds to a respective hash range, and tuples are assigned to buckets based on a hash of the LI. As different LIs may hash to the same range, each bucket may contain updates for multiple LIs (metadata pages).

In some examples, which are not intended to be limiting, IMB1 and IMB2 each include two separate arrays (not shown) of in-memory buckets, an active array that receives new metadata changes and a frozen array that was previously active but is now frozen. Once the active array becomes full, or in some cases earlier, the storage system freezes the active array so that it becomes the frozen array, and clears the frozen array so that it becomes active. The newly-frozen array is then destaged, i.e., by copying the metadata changes from the in-memory buckets to corresponding persistent buckets in a persistent tablet 150 (e.g., Tablet-1, Tablet-2, Tablet-3, etc.). A new persistent tablet 150 may be created upon each destage operation, which may correspond to each active-frozen switch.

Log manager 160 is configured to manage log activities, such as destage operations. Log manager 160 is further configured to manage the RDL 170.

The RDL 170 has a head 172 and a tail 174. New metadata changes (e.g., tuples) and certain bookmarks are be added at the head 172. For example, each time a new metadata change (tuple) is written into one of the in-memory buckets, the same metadata change is written at the head 172 of the RDL 170. The tail 174 advances toward the head 172 whenever entries 170 directly ahead of the tail are no longer needed, e.g., when the metadata changes that they represent have been destaged. In the event of a power failure of system crash, metadata changes can be replayed from the RDL 170, such that no changes are missed. Although the head 172 and the tail 174 are shown in particular positions relative to the RDL, this is merely for illustration. One should understand that the head 172 advances each time an entry 170 is added to the RDL and that the tail 174 advances each time the entries 170 directly ahead of it are no longer needed.

Bookmarks may also be written to the RDL to indicate certain events, such as destage operations. Once a bookmark for a destage operation for a particular MDL has been written to the RDL, all earlier metadata changes written to the RDL for that MDL are no longer needed in the RDL, as those changes have already been persisted in tablets 150. The tail 174 may then advance past those changes, assuming nothing else is holding it back.

In example operation, the hosts 110 issue I/O requests 112 to the data storage system 116. A node 120 receives the I/O requests 112 at the communication interfaces 122 and initiates further processing. To accommodate certain storage operations, such as writes, deletes, and the like, the node 120 creates various metadata changes (e.g., tuples). The node 120 writes the metadata changes to the in-memory buckets of the corresponding MDL (e.g., depending on type T) and also writes the changes to the head 172 of the RDL 170.

Assume, for example, that node 120 writes multiple metadata changes Δ1 to various buckets of IMB1 in MDL1. Individual changes Δ1 may be written over a period of time. Node 120 also writes the changes Δ1 to RDL 170 in entries 180a (e.g., one entry for each change). Once IMB1 becomes full, the log manager 160 initiates a destage operation in MDL1, which causes the changes Δ1 to be written from IMB1 to persistent buckets in Tablet 1. The log manager 160 then enters an associated bookmark 180b into the RDL. Because the bookmark 180b indicates that the changes Δ1 have been persisted, the log manager 160 may advance the tail 174 from a starting location (behind 180a) to the depicted location. The space occupied by entries 180a and 180b then becomes available for overwriting.

Sometime later, node 120 writes metadata changes Δ2 to IMB1 and concurrently writes the same changes to the RDL, creating log entries 180c. Around the same time or later, node 120 also writes metadata changes Δ3 to IMB2 in MDL2 and writes the same changes to the RDL, creating log entries 180d.

Assume now that the changes 43 cause IMB2 of MDL2 to become full. Log manager 160 then induces a destage operation in MDL2, causing the changes 43 to be written to persistent buckets in Tablet-3. Log manager 160 also adds a bookmark 180e to the RDL to mark the destaging of changes Δ3. As the metadata changes 43 have been persisted, the metadata changes 43 are no longer needed for recovery. However, the tail 174 of the RDL cannot advance because the changes 42 in MDL1 (entries 180c) have not yet been destaged and persisted. The tail 174 of the RDL is thus held back from advancing by the entries 180c.

If IMB1 in MDL1 fills more slowly than IMB2 in MDL2, an out-of-space condition can arise in the RDL, if it continues to receive changes for MDL2. To avoid this outcome, the log manager 160 monitors a fullness indicator 176 of the RDL. When the fullness indicator 176 reports that the RDL is running low on space (e.g., reaches a high-water mark), the log manager 160 issues an early-destage request 162 to MDL1. MDL1 responds by performing an early destage operation, writing metadata changes 42 to Tablet-2 even though IMB1 is not yet full. Log manager 160 adds a bookmark 180*f* to the RDL to mark the persistence of changes Δ2 in MDL1. The log manager 160 then detects that the entries 180*c*, which were previously holding back the tail 174, are now persisted and are no longer needed. The tail 174 can then advance beyond these changes, creating additional free space in the RDL and avoiding the out-of-space condition.

Persistent buckets in the tablets 150 have a fixed size, such as 4 kB, 8 kB, or 16 kB, for example, which is typically large enough to accommodate the contents of in-memory buckets when the in-memory buckets are full. However, early destaging of sparsely-filled in-memory buckets produces sparsely-filled persistent buckets, which, as described above, can be space-inefficient and can confuse system debt accounting.

To avoid these outcomes, improvements herein introduce the concept of logical persistent buckets, which can be smaller than the physical persistent buckets of fixed size that contain them. For example, when destaging changes Δ2 from sparsely-filled in-memory buckets, the log manager 160 establishes a size of logical buckets 152 to something smaller than the size of physical buckets, such as one-half, one-quarter, or one-sixteenth the size of physical buckets. By contrast, persistent buckets 154 and 156 have the fixed, physical bucket size, as they were not created as results of early destaging.

Particular benefits follow when multiple logical buckets (e.g., 2, 4, 8, 16, etc.) are contained within a single physical bucket, as the physical buckets are then completely utilized, or nearly so. Not only do the logical buckets avoid wasting space, but also they allow the number of physical buckets to be a good estimate of system debt. The debt that these buckets estimate is that needed to write the metadata changes contained in the physical buckets to metadata pages on disk. Such writing may be regarded as a second destaging process and generally involves reading each indicated metadata page from backend storage, calculating all changes in that metadata page from all tablets and in-memory buckets, updating the metadata page to reflect all of the changes, and writing the updated metadata page back to disk.

Figure 2:
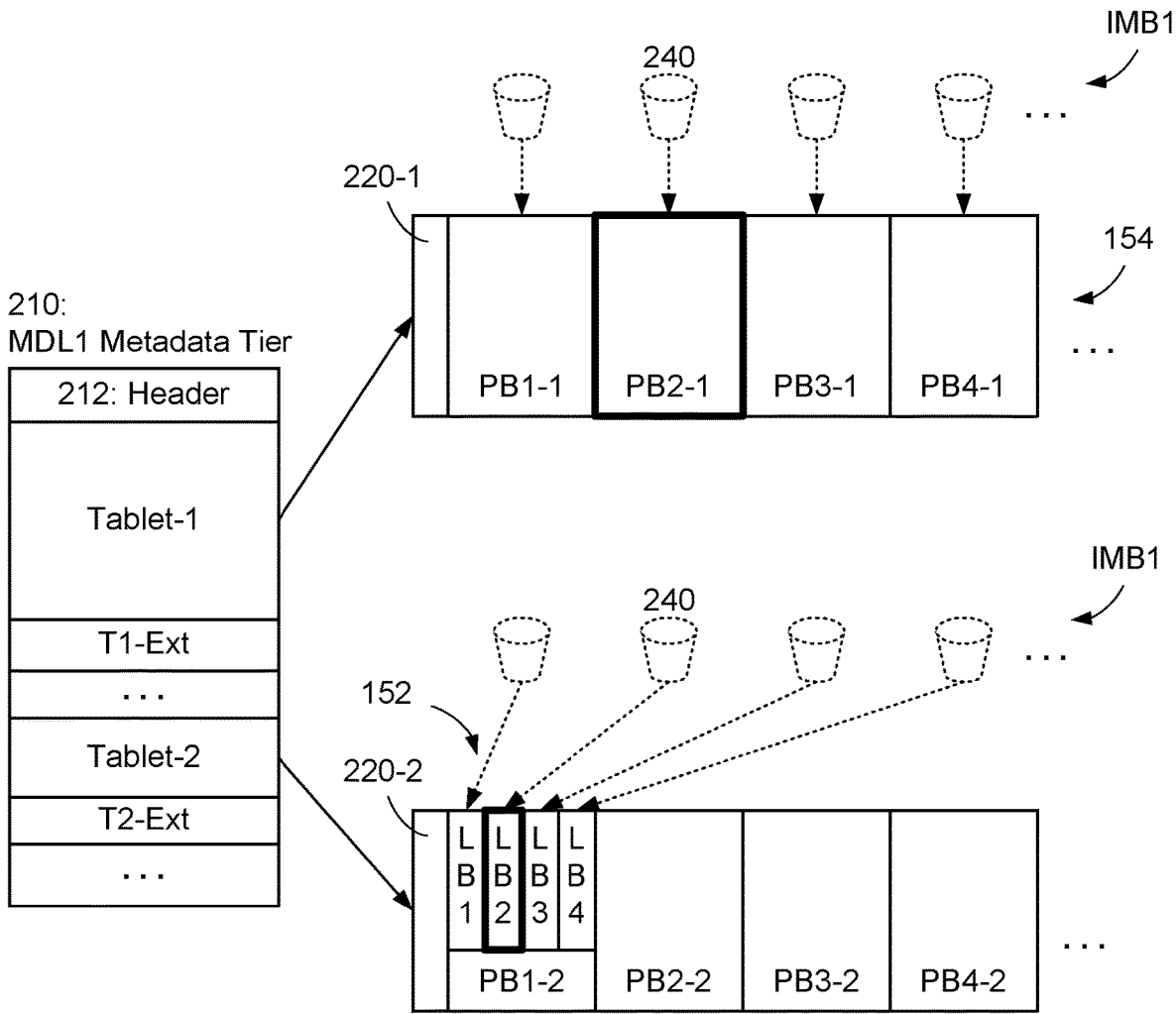
FIG. 2 is a block diagram showing example physical buckets and logical buckets within tablets according to some embodiments.

FIG. 2 shows additional features of tablets, physical buckets, and logical buckets. In this example, portions of a metadata tier 210 for MDL1 appear to the left. For example, the metadata tier 210 may be implemented in a dedicated set of disk drives or in a particular partition. The metadata tier 210 has a header 212, such as a superblock, which stores information about the metadata tier 210 and its contents. Such contents may include persistent tablets 150, such as Tablet-1 and Tablet-2 (FIG. 1), as well as respective extension regions T1-Ext and T2-Ext. The extension regions are provided for storing overflows. For example, different in-memory buckets may randomly contain different numbers of metadata changes, and the contents of some in-memory buckets may be too large to fit within the persistent buckets to which they are destaged. This may occur occasionally despite the fact that, on average, the contents of in-memory buckets fit within the persistent buckets with some room to spare.

An expanded view of Tablet-1 is shown at the upper-right. Here, Tablet-1 includes a header 220-1 and multiple physical buckets 154 (PB1-1 through PB4-1). Only four such physical buckets 154 are shown, but typical numbers may be in the thousands or millions. The header 220-1 may store information about the geometry of the physical buckets 154 and the locations of logical buckets. In the case of Tablet-1, the physical buckets and the logical buckets are the same, as in-memory buckets of IMB1 (shown in phantom) are destaged one-to-one to physical buckets 154.

The arrangement in Tablet-2 (bottom-right) is different, as in-memory buckets of IMB1 are destaged one-to-one to respective logical buckets 152, rather than to respective physical buckets (Physical Buckets PB1-2 through PB4-2 are shown.) In this case, four in-memory buckets are destaged to a single physical bucket, PB1-2. Although not required, a particular geometry may apply to an entire tablet as a whole. For example, Tablet-1 may have 1:1 geometry across its entire size, and Tablet-2 may have 4:1 geometry across its entire size. Header 220-2 reflects the 4:1 geometry and provides information that enables individual logical buckets to be found.

Locating logical buckets maybe crucial to certain processes, such as responding to read requests and performing a second destaging to disk. For responding to a read request of a particular metadata page, the storage system identifies an LI (logical index) of the page, and hashes the LI to identify the in-memory bucket (shown as bucket 240) where updates to the page may be found. The storage system also looks for updates in corresponding persistent buckets of the tablets 150. The updates in Tablet-1 are easily found in the physical bucket PB2-1, which directly corresponds to in-memory bucket 240. The updates in Tablet-2 are also easily found, but an extra step is involved of calculating the location of LB2 based on the geometry, which may be stored in the header 220-2. In some examples, the notion of logical buckets is used even when the geometry is 1:1, such that the same acts are performed for accessing buckets in all cases. Destaging tablets 150 to disk may proceed by accessing updates in corresponding buckets (e.g., PB2-1 and LB2), merging their contents, and performing a read-modify-write of the merged contents to a metadata page on disk. LB2 may be located in the same manner as described above.

FIGS. 3 and 4 show example methods 300 and 400 that may be carried out in connection with the environment 100. The methods 300 and 400 are typically performed, for example, by the software constructs described in connection with FIG. 1, which reside in the memory 130 of a node 120 and are run by the set of processors 124. The various acts of methods 300 and 400 may be ordered in any suitable way. Accordingly, embodiments may be constructed in which acts are performed in orders different from those illustrated, which may include performing some acts simultaneously.

FIG. 3 shows an example method of establishing sizes of logical buckets. At 310, a baseline logical bucket size is calculated as the sum of a bucket header size (not shown) and a quotient of raw delta space of the in-memory buckets divided by the number of in-memory buckets. This raw delta space is the amount of space needed to store all of the metadata changes (e.g., tuples) stored in the entire array of in-memory buckets being destaged, and the number of in-memory buckets is the number of buckets in the entire array of in-memory buckets being destaged.

At 320, the baseline size calculated at 310 is overprovisioned to reduce extension usage. The baseline size may also be rounded up. For example, if physical blocks are 8 kB long and the baseline size is 3.5 kB, the baseline size may be rounded up to 4 kB. Preferably, the overprovisioning and rounding yield a logical bucket size that is a power-of-two division of the physical bucket size. For example, 4 kB is one-half of 8 kB. Other preferred options (based on different baseline sizes) include 2 kB (one-quarter), 1 kB (one-eighth), or 512 Bytes (one-sixteenth), for example. Mathematically, the logical bucket size may be adjusted so that it equals the physical bucket size divided by $2^N$, where N is a positive integer.

Just as physical buckets 154 can occasionally be too small to contain the contents of corresponding in-memory buckets, requiring extension regions, logical buckets 152 may also occasionally be too small. Thus, the use of extension regions is expected to continue, although such usage can be reduced by overprovisioning.

At 330, a number is calculated of logical buckets per physical bucket (if not known already) as physical bucket size divided by the overprovisioned baseline size. Assuming a physical-bucket size of 8 kB, for example, the calculated number may be 2 for 4-kB logical buckets, 4 for 2-kB logical buckets, 8 for 1-kB logical buckets, and 16 for 512-Byte logical buckets.

At 340, the tablet header (e.g., 220-2) is updated to reflect the bucket/tablet geometry. For example, the geometry may be stored simply as the result of step 330, i.e., the physical bucket size divided by the overprovisioned baseline size.

Although the method 300 assumes an equal division of physical buckets into logical buckets, this is just an example. Unequal divisions may also be supported, and the number of logical buckets per physical bucket need not be a power of two. When using unequal division, logical buckets may be limited to the sizes of their actual contents (without extra space or overprovisioning), and logical buckets may be packed together within physical buckets without gaps. Such an arrangement may achieve even greater space efficiency, but at the cost of additional header information being needed for locating logical buckets.

FIG. 4 shows an example method 400 of tracking metadata changes and provides an overview of some of the features described above. Act 410 begins after receiving a first plurality of metadata changes Δ1 into a plurality of in-memory buckets, IMB1. Here, the first plurality of metadata changes Δ1 is destaged to persistent buckets 154 of a first size (e.g., 4 kB, 8 kB, 16 kB, etc.) in a first persistent tablet, Tablet-1. These persistent buckets may be regarded as physical buckets, or as logical buckets having the same size as physical buckets.

At 420, a second plurality of metadata changes Δ2 is received into the plurality of in-memory buckets, IMB1.

Act 430 then begins in response to receiving an early-destage request 162 prior to the plurality of in-memory buckets IMB1 becoming full. Here, the second plurality of metadata changes Δ2 is destaged to persistent buckets 152 of a second size in a second persistent tablet, Tablet-2, where the second size is smaller than the first size.

In some examples, the method 300 and/or 400 may be embodied as a computer program product including one or more non-transient, computer-readable storage media 450, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

An improved technique has been described for managing metadata changes. The technique includes destaging metadata changes from an array of in-memory buckets to persistent buckets having variable size. Larger persistent buckets are used when in-memory buckets are fuller, and smaller persistent buckets are used when in-memory buckets are less full.

Having described certain embodiments, numerous alternative embodiments or variations can be made. For example, although embodiments have been described that involve two different metadata delta logs (MDLs), the same principles can be applied in systems having greater than two MDLs. Further, although the early-destage request 162 is described in connection with MDL1, it may also be used in connection with MDL2, or with any other MDL.

Also, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, persistent tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Further, although the term "user" as used herein may refer to a human being, the term is also intended to cover non-human entities, such as robots, bots, and other computer-implemented programs and technologies. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of tracking metadata changes, comprising:

after receiving a first plurality of metadata changes into a plurality of in-memory buckets, destaging the first plurality of metadata changes to persistent buckets of a first size in a first persistent tablet;

receiving a second plurality of metadata changes into the plurality of in-memory buckets; and in response to receiving an early-destage request prior to the plurality of in-memory buckets becoming full, destaging the second plurality of metadata changes to persistent buckets of a second size in a second persistent tablet, the second size being smaller than the first size, wherein the plurality of in-memory buckets is part of a first metadata log (MDL), and wherein the method further comprises destaging to a third persistent tablet a third plurality of metadata changes received by in-memory buckets of a second MDL, wherein the early-destage request is issued in response to destaging the third plurality of metadata changes of the second MDL.

2. The method of claim 1, further comprising recording metadata changes received by both the first MDL and the second MDL in a persistent, time-ordered log, wherein the early-destage request is issued further in response to the persistent, time-ordered log becoming full.

3. The method of claim 2, wherein destaging the second plurality of metadata changes in response to the early-destage request enables space within the persistent, time-ordered log to be reclaimed, thus preventing an out-of-space condition from arising in the persistent, time-ordered log.

4. The method of claim 1, wherein destaging the first plurality of metadata changes to the persistent buckets in the first persistent tablet includes copying metadata changes from respective in-memory buckets of the plurality of in-memory buckets to respective physical buckets of the first persistent tablet, the physical buckets having uniform size.

5. The method of claim 4, wherein destaging the second plurality of metadata changes to the persistent buckets in the second persistent tablet includes copying metadata changes from respective in-memory buckets of the plurality of in-memory buckets to respective logical buckets within physical buckets of the second persistent tablet, wherein the physical buckets in the second persistent tablet have the same uniform size as the physical buckets in the first persistent tablet and wherein multiple logical buckets are stored within each physical bucket of the second persistent tablet.

6. The method of claim 5, wherein the logical buckets have uniform size, and wherein a number of logical buckets within each physical bucket is a power of two.

7. The method of claim 6, further comprising determining the power of two such that, on average, the logical buckets are larger than required to store the metadata changes in respective in-memory buckets of the plurality of in-memory buckets.

8. The method of claim 7, wherein a logical bucket is too small to store all of the metadata changes from a respective in-memory bucket, and wherein the method further comprises storing an overflow of metadata changes in an extension region associated with the second persistent tablet.

9. The method of claim 5, wherein the logical buckets are not uniform in size, and wherein multiple logical buckets are packed together within a physical bucket without gaps.

10. The method of claim 8, further comprising storing a header that identifies locations of respective logical buckets within a physical bucket.

11. A computerized apparatus, comprising control circuitry that includes a set of processors coupled to memory, the control circuitry constructed and arranged to:

after receipt of a first plurality of metadata changes into a plurality of in-memory buckets, destage the first plurality of metadata changes to persistent buckets of a first size in a first persistent tablet;

receive a second plurality of metadata changes into the plurality of in-memory buckets; and in response to receipt of an early-destage request prior to the plurality of in-memory buckets becoming full, destage the second plurality of metadata changes to persistent buckets of a second size in a second persistent tablet, the second size being smaller than the first size, wherein the plurality of in-memory buckets is part of a first metadata log (MDL), and wherein the control circuitry is further constructed and arranged to comprises destage to a third persistent tablet a third plurality of metadata changes received by in-memory buckets of a second MDL, wherein the early-destage request is issued in response to destaging the third plurality of metadata changes of the second MDL.

12. A computer program product including a set of non-transitory, computer-readable media having instructions which, when executed by control circuitry of a computerized apparatus, cause the computerized apparatus to perform a method of tracking metadata changes, the method comprising:

after receiving a first plurality of metadata changes into a plurality of in-memory buckets, destaging the first plurality of metadata changes to persistent buckets of a first size in a first persistent tablet;

receiving a second plurality of metadata changes into the plurality of in-memory buckets; and in response to receiving an early-destage request prior to the plurality of in-memory buckets becoming full, destaging the second plurality of metadata changes to persistent buckets of a second size in a second persistent tablet, the second size being smaller than the first size, wherein the plurality of in-memory buckets is part of a first metadata log (MDL), and wherein the method further comprises destaging to a third persistent tablet a third plurality of metadata changes received by in-memory buckets of a second MDL, wherein the early-destage request is issued in response to destaging the third plurality of metadata changes of the second MDL.

13. The computer program product of claim 12, wherein the method further comprises recording metadata changes received by both the first MDL and the second MDL in a persistent, time-ordered log, and wherein the early-destage request is issued further in response to the persistent, time-ordered log becoming full.

14. The computer program product of claim 12, wherein destaging the first plurality of metadata changes to the persistent buckets in the first persistent tablet includes copying metadata changes from respective in-memory buckets of the plurality of in-memory buckets to respective physical buckets of the first persistent tablet, the physical buckets having uniform size.

15. The computer program product of claim 14, wherein destaging the second plurality of metadata changes to the persistent buckets in the second persistent tablet includes copying metadata changes from respective in-memory buckets of the plurality of in-memory buckets to respective logical buckets within physical buckets of the second persistent tablet, wherein the physical buckets in the second persistent tablet have the same uniform size as the physical buckets in the first persistent tablet, and wherein multiple logical buckets are stored within each physical bucket of the second persistent tablet.

16. The computer program product of claim 15, wherein the logical buckets have uniform size, and wherein a number of logical buckets within each physical bucket is a power of two.

17. The computer program product of claim 16, further comprising determining the power of two such that, on average, the logical buckets are larger than required to store the metadata changes in respective in-memory buckets of the plurality of in-memory buckets.

18. The computer program product of claim 17, wherein a logical bucket is too small to store all of the metadata changes from a respective in-memory bucket, and wherein the method further comprises storing an overflow of metadata changes in an extension region associated with the second persistent tablet.

* * * * *